April 7, 1936.   F. D. SWEET ET AL   2,036,894
FILM HANDLING APPARATUS
Filed May 26, 1932   2 Sheets-Sheet 1
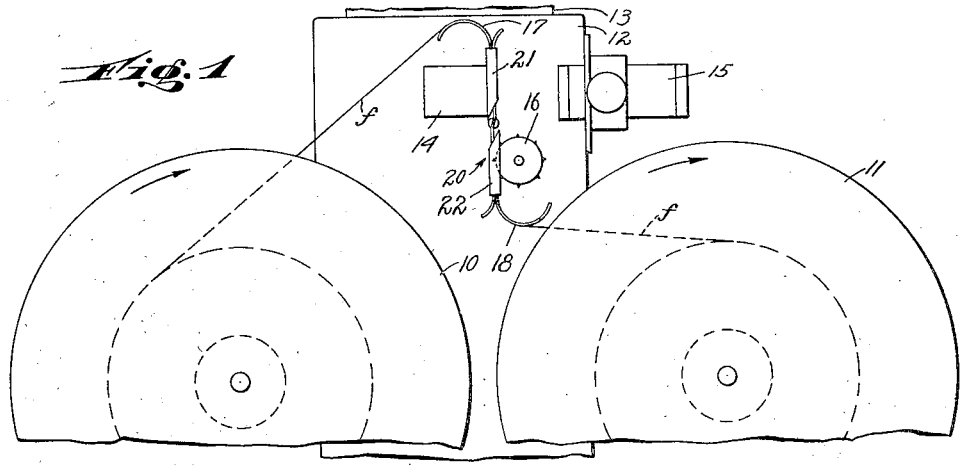
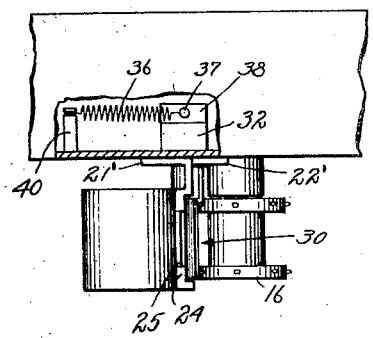
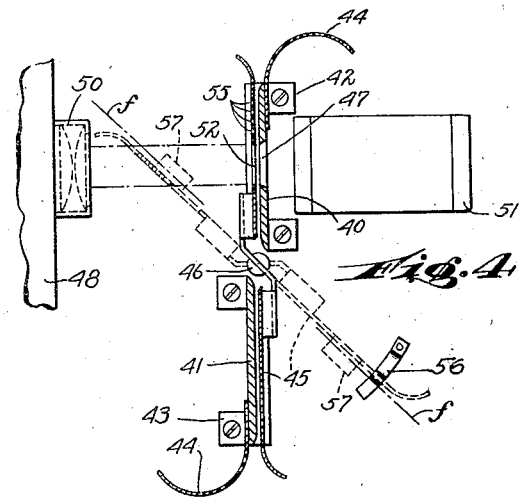
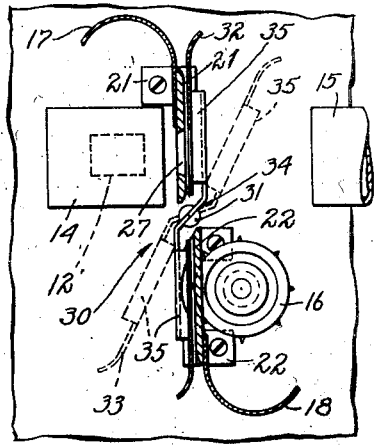
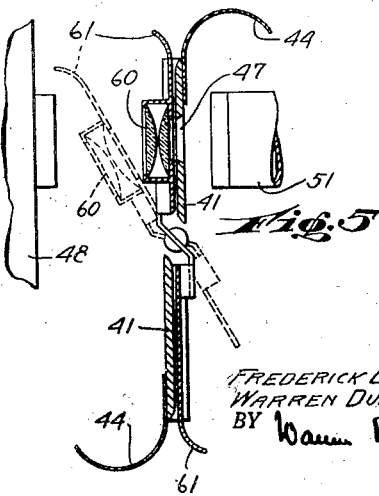
INVENTORS
FREDERICK DAVENPORT SWEET.
WARREN DUNHAM FOSTER.
BY
ATTORNEY.

April 7, 1936.  F. D. SWEET ET AL  2,036,894
FILM HANDLING APPARATUS
Filed May 26, 1932  2 Sheets-Sheet 2
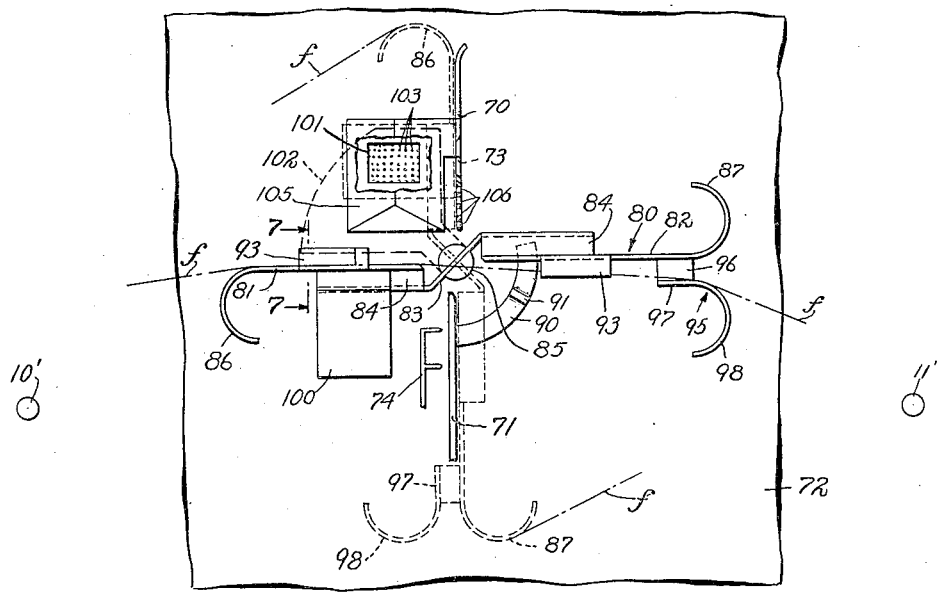
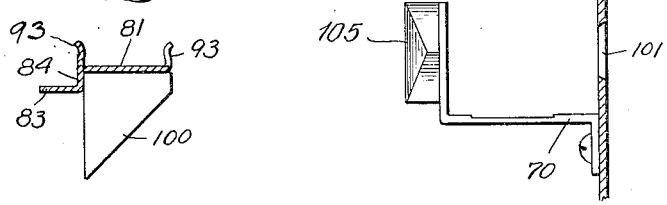
INVENTORS
FREDERICK DAVENPORT SWEET.
WARREN DUNHAM FOSTER.
BY Warren D. Foster
ATTORNEY.

Patented Apr. 7, 1936

2,036,894

UNITED STATES PATENT OFFICE 2,036,894

FILM HANDLING APPARATUS

Frederick Davenport Sweet, New York, N. Y., and Warren Dunham Foster, Washington Township, Bergen County, N. J., assignors, by direct and mesne assignments, to Kinatome Patents Corporation Application May 26, 1932, Serial No. 613,600

50 Claims. (Cl. 88—17)

The present invention relates generally to film handling apparatus and more particularly to gates for such apparatus and especially to gates for motion picture projectors and cameras, or for apparatus for the recordation of sound upon film or its reproduction therefrom.

It is a primary object of our invention to provide an improved openable gate for film handling apparatus which is disposable in open position so as to create a film threading path between the delivery reel and the take up reel much shorter and more direct than the film feeding path whereby the film may be much more easily threaded or rewound through the apparatus.

It is another object of our invention to provide an improved openable gate for film handling apparatus having a movable section effective for performing a plurality of functions whereby the number of parts in the apparatus and the manufacturing cost of the same may be reduced and the operation of the apparatus simplified.

It is another object of our invention to provide an improved gate for a motion picture projector having a movable section which becomes operative when in open position to protect the film in the gate from the heat of the lamp of the apparatus.

It is a further object of our invention to provide a gate for film handling apparatus having means for creating a substantially direct film rewinding path through the gate from the delivery reel to the take-up reel, which reels are positioned on each side of the gate.

It is a further object of our invention to provide a gate having improved simple and inexpensive means for necessarily stripping the film from the intermittent film feeding member preparatory to establishing a film rewinding path between the take up reel and the delivery reel.

It is a further object of our invention to provide a gate for motion picture projectors having means for cooperation with the main source of light of the projector to utilize said light to illuminate the threading and rewinding paths of the film through the gate.

According to one way our invention may be carried out, a gate for a motion picture projector has its fixed section mounted in an upright plane between a delivery reel and a take-up reel both of which reels may be disposed in the same horizontal plane adjacent the base of the projector. The upper and lower portions of the fixed section may be offset slightly or disposed in angular relation one to the other in the same lateral plane of the gate and a movable gate section having corresponding upper and lower offset or angularly disposed portions may be pivoted on a horizontal stub shaft parallel to the film path and disposed at one side thereof opposite an open space between the upper and lower fixed gate portions. The movable section is mounted to be swung about its pivot away from the fixed gate section to a film threading position wherein it permits easy threading of the film through the gate by a movement of the film from the delivery reel over the upper portion of the movable gate section and under the lower portion thereof to the take-up reel. The movable section is then released and is swung against the fixed gate section by a spring and carries the film with it to film feeding position. For film rewinding purposes, the movable gate section may be swung away from the fixed gate section past the film threading position to a rewinding position wherein the movable section extends in an approximately direct line from the take-up reel to the delivery reel and creates a film rewinding path.

It is a feature of our invention to provide a simple inexpensive integral member on the movable gate section which is effective for stripping the film from the intermittent feeding member and which also helps create the rewinding path of the film. It is a further feature of our invention to provide simple integral inexpensive members on the movable gate section for latching it firmly to the fixed gate section whereby film tensioning members may be advantageously mounted on said movable gate section and make possible the employment of the Bundick and Proctor method of feeding the film through the gate.

It is a further feature of our invention to mount a prism or other light deflecting device on the movable gate section for cooperation with usual apertures in the gate and a lamp on the opposite side of the apparatus from the gate; this prism being movable out of operative position with the gate necessarily renders the light rays from the lamp ineffective to burn the film in the gate when the gate is open.

According to another way in which our invention can be carried out, tension control members may be mounted on the fixed gate section and a condensing lens may be mounted on the movable gate section for cooperation with a lamp placed to the rear of the gate and on the same side of the apparatus.

It will be understood that in the specification and claims of this application the term "lateral plane of the gate" means a plane through the gate taken at right angles to the film path through the gate, and the term "plane of the gate" means a plane along the film path of the gate. It will be further understood that a gate portion specified as being oppositely faced relative to the other gate portion has its fixed gate section and its movable gate section arranged for engaging sides of the film opposite, respectively, to the sides engaged by the fixed gate section and the movable gate section of said other gate portion.

Other features and advantages of our invention will appear hereinafter.

In the accompanying drawings certain exemplifications and forms of film handling apparatus embodying our invention are disclosed. Our improvements may take other forms without departing from the spirit of our invention or the scope of our broader claims.

Figure 1 is a partial diagrammatic side view of a motion picture projector embodying our invention.

Figure 2 is an enlarged top view broken away in part of the structure shown in Figure 1.

Figure 3 is a partial side view partly in section of the structure shown in Figure 2.

Figure 4 is a side view broken away in part showing a form of a gate embodying our invention which differs in certain respects from the gate shown in Figure 3, being arranged for use with the lamp house disposed on the same side of the apparatus as the gate.

Figure 5 is a side view broken away in part which shows a gate embodying our invention in a form somewhat different from that shown in Figure 4.

Figure 6 is a partial view of a preferred form of our invention showing a movable gate section disposed in film rewinding position.

Figure 7 is a cross-section along the line 7—7 of Figure 6.

Figure 8 is a partial top view of the structure shown in Figure 6 which illustrates means cooperating with the main source of light of the apparatus for illuminating the film threading path of the gate during film manipulation.

Our invention may be advantageously applied to a motion picture projector of the kind disclosed in the co-pending application of Warren Dunham Foster, Serial Number 613,663, filed concurrently herewith which matured into Patent No. 1,944,029, Jan. 16, 1934, wherein a delivery reel 10 and a take-up reel 11 may be mounted on a frame 12 in the same horizontal plane adjacent the base of the projector. A usual lamp (not shown) may be mounted in a lamp-house 13 on the opposite side of the frame 12 from the gate and the frame may have an opening 12' whereby a beam of light from the lamp may pass forwardly and engage against a deflecting device 14 such as a prism or mirror and be reflected to a usual objective lens 15 mounted on the front of the frame 12.

A film f preferably will be fed intermittently from the delivery reel 10 to the take-up reel 11 by intermittent film feeding means of the kind associated with the tension control method described in the co-pending application of Bundick and Proctor, Serial Number 44,482 filed July 18, 1925. Such feeding means may include a sprocket 16, an upper curved resilient film tensioning member and a lower curved resilient film tensioning member 18 which also serve as film guiding members. The film tensioning members 17 and 18 may be mounted on fixed members of a gate structure generally designated as 20 which may be mounted on the frame 12 and be constructed as is set forth hereinafter.

One form of the gate 20 may include a fixed gate section having an upper portion 21 and a lower portion 22 which gate portions may be fastened to the frame 12 by integral lug elements 21' and 22' respectively. The gate portions 21 and 22 are offset with respect to each other so that as viewed in Figure 3 the right face of the upper portion 21 and the left face of the lower portion 22 define a substantially straight path for the film f through the gate.

The upper gate portion 21 may be formed to have a channel 24 and have its centrally disposed right face relieved in a usual way at 25. The lower gate portion 22 may be constructed with an oppositely disposed channel and relieved face (not shown) to correspond with the above noted construction of the gate portion 21. The film tensioning members 17 and 18 may be relieved and be fastened on the upper and lower end of the gate portions 21 and 22 respectively, the ends of which gate portions will preferably be tapered off to prevent scratching the film as it passes from the curved members along the work faces of the gate portions. The upper gate portion 21 may have an aperture 27 positioned for cooperation with the prism or mirror 14 and the objective lens 15 and the lower gate portion 22 may have suitable apertures through which the sprocket 16 may pass from its mounting on the right of the gate portion to engage the film f pressed against the left face of the lower gate portion 22 by devices to be described.

To cooperate with the fixed gate portions 20 and 21, a movable gate section generally designated as 30 is provided which may be mounted on a horizontal stub shaft 31 disposed at one side of the film path and journalled in a bushing 32 which is secured against the rear face of the frame 12 opposite an open space left between the upper and lower fixed gate portions. The gate 30 may have an upper portion 32 and a lower portion 33 connected by an intermediate offset web portion 34 which is securely fastened on the shaft 31 and integrally connected with the upper and lower portions 32 and 33 by flange elements 35. The construction of the movable gate section may be the same as the movable gate section described in the above noted application of Warren Dunham Foster, Serial Number 613,663 filed concurrently herewith which matured into Patent No. 1,944,029, Jan. 16, 1934. The arrangement of the offset web portion 34 and the shaft 31 at one side of the film work path advantageously permits the film to pass without bending from the upper to the lower movable gate portion as it is fed through the apparatus.

The movable gate section 30 is normally urged counter-clockwise by a spring 36 (Figure 2) having one end fastened to a pin 37 in a collar 38 secured on the shaft 31 and the other end fastened to a pin 40 in the frame 12. The cooperative arrangement of the upper movable gate portion 32 and the lower movable gate portion 33 is such that under the action of the spring 36 each of these movable gate portions is urged squarely against the adjacent fixed gate portion. Because of the above described pivoted mounting of the movable gate section 30, it may yield and be advantageously swung away from the fixed gate section a minute amount in such cases as when a patch or thickened portion of the film is moved to the point where the patch is just passing between the gate sections. Thus it will be seen by those skilled in the art that the movable gate section may also serve in effect as a yielding presser member which compensates for inequalities of thickness in the film.

In Figure 4 is shown a form of gate embodying our invention which differs somewhat from the gate structure shown in Figures 1 to 3. An upper offset fixed gate portion 40 and a lower offset fixed gate portion 41 may be mounted on a suitable frame which may be like the frame 12 of Figure 1 by means of lug members 42 and 43 respectively. Curved resilient film tensioning members 44 may be mounted on the ends of the fixed gate portions 40 and 41. A movable gate section 45 may be mounted on a stub shaft 46 and be constructed substantially the same way as the gate section 30, except as hereinafter noted. As viewed in Figure 4, the gate section 45 and the gate portions 40 and 41 are turned in an opposite direction from the gate portions of Figure 3 and the gate section 45 may be mounted to be swung a greater distance angularly from the fixed gate portions 40 and 41 than is needed for the gate section 30 of Figure 3.

The upper gate portion 40 may have an aperture 47 positioned for cooperation with the lamp (not shown) in a lamp-house 48 and a condensing lens 50 mounted on the lamp-house, and an objective lens 51. To cooperate with the aperture 47 in the fixed section 40 an aperture 52 is provided in the upper portion of the movable gate section 45, and, as indicated by the light path outlined by the dot and dash lines in Figure 4, a beam of light may pass from the condensing lens 50 through the gate sections 40 and 45 at substantially right angles thereto.

By inspection of the dotted line representation of the gate section 45 in Figure 4, which shows this gate section in open position, it can be seen that the aperture 52 is disposed entirely below the path of the light beam which arrangement thus automatically brings a light arresting portion of the gate section across the light path and prevents the full strength of the heat from the light source reaching the film which would be damaged ordinarily by such heat should the film be stationary when the gate section 45 is in open position. To make it possible to utilize the main source of light in the apparatus for illuminating the gate when the movable gate section 45 is in open position, as when a film is being threaded through the apparatus, a plurality of small holes 55 are provided in the movable gate section 45 above the aperture 52 and are so positioned that when the gate section 45 is swung to open position these holes will be disposed in the light path and permit a reduced amount of light from the main source in the housing 48 to pass through them and reach the gate to illuminate the same. The intensity of the light passing through the holes 55 will be such that the heat from these light beams will not damage the film although affording sufficient illumination for film threading purposes.

Our arrangement of the lens 50 and the movable gate section 45 so that the latter may be swung away from the fixed gate section 40 a large angular amount affords an important advantage in that the film may be more easily threaded through the apparatus which may be done by simply drawing the film along the upper or right hand face of the upper portion of the gate section 45 and thence along the lower or left hand face of the lower portion of the gate section 45 while it is disposed in the open (dotted line) position wherein it may be releasably held by a suitable latching device 56. When the pivoted gate section 45 is released it may be swung to operative film feeding position by a spring mechanism (not shown) which may be constructed as that shown in Figure 2 or in any desired manner. The movement of the gate section 45 by such a spring mechanism carries with it the film and presses the same against the fixed gate portions 40 and 41. To help hold the film f against the movable gate section 45 while the same is being moved up to the fixed gate portions 40 and 41, side guide members 57 may be provided on the upper and lower portions of the gate section 45 to engage against each side edge of the film. In order to latch the movable gate section in cooperative relation with the fixed section, each of these side guides 57 may include a latch formation bent inwardly to engage an appropriate surface upon the fixed section.

In Figure 5 there is illustrated another embodiment of certain features of our invention. The gate structure of Figure 5 may be substantially the same as that of Figure 4 except that condensing lenses 60 are mounted on a movable gate section 61 and are disposed opposite the aperture 47 in the fixed gate section instead of on the lamp house 48. By this arrangement the stationary film at the aperture is protected from the heat of the lamp (not shown) in the lamp house 48 upon a very small opening movement of the movable gate section 61. This occurs because the focus of the lens 60 relative to the film at the aperture will be substantially destroyed upon a very small angular movement of the gate section 61. Moreover, the lens then being out of focus will tend to diffuse and diminish the light from the lamp in the lamp house 48. This arrangement of the movable gate and the lens affords an additional advantage because it not being necessary to swing the gate open very far to protect the film, the lamp house 48 may be positioned nearer the gate than is done in the structure of Figure 4, which makes for a more compact apparatus, and is particularly desirable with certain forms of condensing lenses which should be placed relatively closely to the light source.

In Figures 6 to 8 inclusive, a preferred form of our invention is illustrated wherein a fixed gate section may include an upper portion 70 and a lower portion 71 which is offset with respect to the upper portion so that as viewed in Figure 6 the left face of the upper gate portion 70 and the right face of the lower gate portion 71 define a substantially straight work path for the film f through the gate. The work paths of the gate portions 70 and 71 may be relieved in a usual way and be mounted by suitable integral members (not shown) on the side of a mounting frame designated as 72 which is shown in part in Figures 6 and 8. The upper gate portion 70 may have an aperture 73 and suitable openings (not shown) may be provided in the lower portion 71 to permit an intermittent film feeding claw member 74 to move operatively from the left through said apertures and engage the film f. The upper end of the upper gate portion 70 is curved slightly to the right to help provide an entrance throat for the film. The lower gate portion 71 may be shorter than the upper portion 70, and the inner ends of the gate portions 70 and 71 are spaced apart a considerable distance for reasons to presently appear.

For cooperation with the fixed gate portions 70 and 71 we provide a movable gate portion generally designated as 80 which may include an upper portion 81 and a lower portion 82 which may be connected by a web portion 83 and flange portions 84. It can be readily seen by those skilled in the art of sheet metal working that parts 81, 82, 83 and 84 may be formed from one piece of sheet metal. The movable gate section 80 is preferably mounted for pivotal movement on a stub shaft 85 which may extend inwardly through the frame 72 and be journalled in devices such as are shown in Figure 2 for the shaft 31. The construction of the parts 81, 82, 83 and 84 of the movable gate 80 and the shaft 85 may be substantially the same as that of the movable gate section and its mounting shaft shown in the co-pending application of Warren Dunham Foster, Serial Number 613,663, filed concurrently herewith which matured into Patent No. 1,944,029, Jan. 16, 1934.

The form of gate shown in Figure 6 is especially suited for use with film feeding means employing the Bundick and Proctor film tension control system which is disclosed in the co-pending application of Bundick and Proctor, Serial Number 44,482, filed July 18, 1925 which matured into Patent No. 1,944,022, Jan. 16, 1934, although it is not in any way limited thereto. To that end, a curved film tensioning member 86 may be mounted on the upper end of the movable gate portion 81 and a similar curved film tensioning member 87 may be mounted on the lower end of the movable gate portion 81. The curved tensioning members 86 and 87 may be made integral with the gate portions 81 and 82 or may be made as separate resilient pieces and be fastened by suitable means to the movable gate portions.

As illustrated in Figure 6, our improved gate when disposed as when the film is being intermittently fed past the aperture 73, shows the curved tensioning member 86 turned to the left by which arrangement it may serve to guide the film $f$ from a delivery reel (not shown) which may be mounted on a delivery spindle 10', to the upper end of the gate and thence downwardly between the gate sections 70 and 71 and the movable gate portions 81 and 82. The curved tensioning member 87 on the lower movable gate portion 82 is turned in the opposite direction from the tensioning member 86 and serves to guide the film $f$ as it leaves the gate toward a take-up reel (not shown) which may be mounted on a take-up spindle 11'.

In accordance with that object of our invention which is to provide a gate for film handling apparatus through which a film may be easily and quickly threaded, the mounting of the movable gate 80 is arranged to permit it to be swung from an upright operative film feeding position adjoining the fixed gate sections 70 and 71 counterclockwise through a large angle to a film threading position where the movable gate is disposed nearly horizontal. Also in order to carry out that purpose of our invention, which is to provide a gate operable for creating a film rewinding path therethrough which is substantially straight and of a minimum length, the movable gate section 80 is arranged to swing counter-clockwise through an additional angle to an approximately horizontal rewinding position wherein it is at substantially a right angle to the upright fixed gate section. In such rewinding position the movable gate section may, if desired, extend along a substantially straight course from the take-up reel on the one side of the gate to the rewinding reel on the other side.

For releasably holding the movable gate in either of its film threading or rewinding positions, a yieldable latch member 90 may be fastened by suitable means to the lower fixed gate portion 71 and extend upwardly to the right, as illustrated in Figure 6. This latching member 90 may be arranged with suitable detent grooves or valleys 91 for engaging the inner edge of the lower movable gate portion 82. In some cases, the latch member may be advantageously mounted on the frame 72. When the film $f$ is to be threaded through our improved gate, the movable gate section 80 is preferably disposed in the intermediate dotted line position adjacent the solid line rewinding position of Figure 6. If desired, the movable gate section 80, in film threading position, can be disposed substantially horizontal, and in such case, for rewinding purposes, the movable gate section can be swung counter-clockwise a small angular amount beyond, i. e., below the horizontal position of the same illustrated in Figure 6. To thread the film $f$ through our improved gate the leading end of the film is drawn over the upper (left hand, as viewed in Figure 6) movable gate portion 81 and thence under the lower (right hand) portion 82 and thence to the take up reel to which the film may be fastened in a suitable way by hand or automatically. Then the movable gate section may be released from the detent 90 and its return spring is effective to swing the movable gate section and the film counterclockwise against the fixed gate portions 70 and 71. To help hold the film against the upper and lower movable gate portions 81 and 82 while they are in motion an integral side edge guide member 93 is provided at each side of the gate portions 81 and 82 and is positioned intermediate the inner ends of the same and the curved film guiding members on the outer ends of these movable gate portions. These members 93 are bent at substantially right angles to the plane of their associated gate portions so that one member is disposed on each side of the film $f$. According to this arrangement, as viewed in Figure 6, the guide members 93 are turned up on the gate portion 81 and turned down on the gate portion 82, as viewed when these gate portions are in film rewinding position.

It is a feature of our invention to have the guiding member 93 serve to latch the movable gate section 80 firmly and positively in film feeding position against the fixed gate section for reasons presently to appear. To this end, each of the guide members 93 on the upper movable gate portion 81 is so formed as to have an irregular contour (see Figure 7) which is effective to engage the adjacent side edge of the upper fixed gate portion 70 and hold the movable gate portion firmly thereagainst. It will be understood that a usual pressure plate may be mounted on either the fixed gate portion 70 or on the movable gate portion 81 in a well known way. In order that the movable gate section 80 may be readily swung away from the fixed gate section to film feeding or film rewinding position, the guiding and latching members 93 may have a suitable amount of resilience and for this reason may be made as separate spring metal members fastened to the gate portion 81 if desired.

When our invention is embodied in a film handling apparatus of the kind disclosed in said copending application of Warren Dunham Foster, Serial Number 613,663 filed concurrently herewith, which matured into Patent No. 1,944,029, January 16, 1934, and substantially all of the film has been fed from the delivery reel to the take up reel, rewinding of the film may be automatically begun upon swinging the moving gate section 80 to rewinding position. In such event, it is desirable to make sure the film f is free of the feeding member 74 before the rewinding movement of the film begins. To this end, there is provided a simple stripper device generally designated as 95 which may be fastened to the lower (outer) end of the lower gate portion 82 by a flange element 96 disposed at right angles thereto and which may be integral to both the gate portion 82 and the stripper device 95. To the flange element 96, may be integrally joined a flat film-stripping portion 97 which may be disposed substantially parallel to the movable gate portion 82 a short distance below the same (as shown in Figure 6 in solid line). To the outer end of the stripper portion 97 may be integrally joined a curved resilient film guiding portion 98. When the movable gate section 80 is disposed in upright film feeding position the stripper element 97 is positioned below the gate position 71 and to the left of the film f and therefore upon a slight opening movement of the movable gate section 80 the film is necessarily pulled away from the teeth of the feeding member 74 without any attention of the operator. The curved portion 98 and also the curved portions 86 and 87 may be relieved in a usual way.

For certain advantageous reasons which are set forth in the above mentioned co-pending application of Warren Dunham Foster, Serial Number 613,663 filed concurrently herewith which matured into Patent No. 1,944,029, January 16, 1934, a light deflecting device such as a prism 100 may be mounted on the upper movable gate portion 81 on the opposite side from the fixed gate portion 70 for cooperation with a lamp (not shown) on the opposite side of the apparatus from the gate and for cooperation with the aperture 73. To permit the light from the lamp reaching the prism 100, a suitable opening 101 may be provided in the mounting plate 72 opposite the prism 100. In some cases it may be desirable for the prism 100 to have shield devices (not shown) of a suitable kind for preventing light reaching the opening 101 from straying out of the usual work path leading to aperture 72. To provide a firm support for the prism 100, the upper gate portion 81 may be stiffened, if necessary, by any suitable means such as integral longitudinal stiffening ribs formed therein.

It can be seen that when the movable gate portion 81 is in film threading or film rewinding position the prism or mirror 100 will have been moved away from the opening 101 and unless means are provided to prevent it happening, a strong beam of light from the lamp may strike the operator full in the eyes and temporarily and partially blind him. To prevent this and also to provide means for employing a certain part of the light of the lamp for illuminating the gate when manipulating the film as when threading or rewinding it, the following devices are provided as a part of our improved gate. On the inner end of the stub shaft 85 there may be mounted a light deflecting shield or shutter member 102 which has a portion arranged with a large number of small holes 103 therethrough. These holes 103 are so positioned that when the movable gate section 80 is swung to film threading or rewinding position, the holes 103 will be disposed between the opening 101 and the source of light on the opposite side of the apparatus from the gate.

In accordance with that object of our invention which is to provide means for utilizing the light from the main source of the apparatus to illuminate a large part of the gate structure when manipulating the film, as when threading or rewinding, the construction of certain parts of the gate may be as follows. To the upper fixed gate section 70 may be integrally joined a deflector member 105 extending leftwardly approximately parallel to the mounting plate 72. The deflector member 105 may be shaped as shown in Figures 6 and 8, and its specific construction may be the same as that of the similar light deflector member disclosed in the above noted application of Warren Dunham Foster, Serial Number 613,663 filed concurrently herewith which matured into Patent No. 1,944,029, January 16, 1934. The light deflecting surfaces of the member 105 may be suitably plated and polished. It can be seen that light passing through the opening 101 and striking the member 105 when the movable gate section is in rewinding position or in threading position, is reflected partly to the right to illuminate the movable gate portion 82 and partly to the left to illuminate the movable gate portion 81. The remainder of the light rays are deflected downwardly, and consequently none of the rays strike the operator's eyes directly. To permit better illumination of the gate portion 82, a plurality of holes 106 may be provided in the fixed gate section 70 below the aperture 73 and be positioned to cooperate with the deflector member 105. In certain cases the shutter blade 101 may be omitted and the deflector member 105 can serve to arrest rays of light from the lamp and prevent them reaching the operator's eyes.

Certain of the advantages of our invention are evident from the foregoing portion of this specification.

Other advantages of our invention arise from the provision of a gate for a film handling apparatus which can be automatically threaded.

Another advantage of our invention arises from the provision of a gate through which the film may be rewound along a much more direct path than the film feeding path of the gate.

Still other advantages arise from the provision of a gate having inexpensive means for automatically protecting the film from the heat of the lamp upon a slight or other opening movement of the gate.

Still other advantages arise from the provision of a gate having automatic means for cooperation with the main source of light of the apparatus for illuminating the entire openable gate section when it is in film rewinding or film threading position.

Still other advantages result from providing an openable gate, the movable section of which has a plurality of advantageous operative positions distant from the fixed gate section.

We claim:

1. A gate for use in a film handling apparatus comprising a first fixed gate section engaging one side of one portion of the film, a second fixed gate section concomitantly engaging the other side of another portion of the film, a first movable section disposed opposite said first fixed section and engaging the side of the film opposite that engaged by said first fixed section, a second movable section opposite said second fixed section and engaging the side of the film opposite that engaged by said second fixed section, and means connecting said first and second movable sections for concomitantly moving said movable section toward and away from said fixed sections.

2. In a film handling apparatus, in combination, a fixed gate section, a movable section pivotally mounted for intersecting said fixed gate section intermediate the ends thereof, said fixed gate section being provided with an opening through which said pivoted section passes, means for feeding a film between said gate sections, and means for pivotally mounting said movable gate section intermediate its ends whereby one end of said movable gate section presses the film against the upper portion of said fixed gate section, and the other end of said movable gate section presses the film against the lower portion of said fixed gate section.

3. In a film handling apparatus, a gate including a fixed section having an upper portion extending along the film path through said gate and a lower portion offset and oppositely faced from said upper portion and extending along said film path, and a movable gate section arranged for pressing the film against both the upper portion of the fixed gate section and the lower portion of the fixed gate section.

4. The structure described in claim 3 characterized by said movable gate section being pivoted intermediate the upper portion of said fixed gate section and the lower portion of said fixed gate section.

5. In a film handling apparatus, a light source and an apertured openable gate, said gate comprising two sections defining therebetween a track for the film, one of said sections being relatively fixed and the other of said sections being movable in relation to said fixed section upon an axis substantially parallel to the plane of said film track and normal to the direction thereof, and means carried by said movable section for diminishing the heat of the light from said source effective upon the film at said aperture when said movable section is moved away from said fixed section for the purpose of opening said gate, said means allowing a portion of the light from said source to fall upon said film track when said gate is open to facilitate the manipulation of a film in relation thereto.

6. The structure described in claim 3 characterized by said fixed gate section having a central portion cut away and further characterized by said movable gate section having a central portion cut away adjacent the cut away section of said fixed gate section, said cut away portions of said gate sections providing a passageway for movement of the film from the upper part of said gate to the lower part of said gate.

7. In a gate for a film handling apparatus having a source of light, a fixed gate section having an aperture through which light from said source may be passed, a movable gate section having an aperture for cooperation with the aperture in said fixed section, a pivotal mounting for said movable section arranged so that said movable gate section moves away from said fixed gate section always in a plane perpendicular to the plane of said fixed gate section, said movable gate section having an imperforate portion adjoining the aperture in said movable gate section on the opposite side of the aperture from the pivot thereof, said movable gate section being revolvable angularly about said pivotal mounting to an extent that said imperforate portion of said movable gate section is moved entirely across the path of the light from said source to said aperture in said fixed gate section upon opening said movable gate whereby light from said source is prevented from reaching a film which is disposed adjacent said aperture in said fixed section.

8. In a film handling apparatus, an apertured gate including a fixed gate section and a gate section movable angularly with respect to said fixed gate section in a plane normal thereto between an open position and a closed position, a source of light mounted in fixed relation to said fixed gate section and cooperating with the aperture of said gate, and a lens element mounted on said movable gate section for condensing light from said source upon the film at the aperture in said fixed gate section when said movable gate section is in said closed position, the movement of said lens by the movement of said angularly movable gate section serving to destroy the condensation of light from said source upon said aperture thereby protecting the film at said aperture from the heat of said light source when said gate is opened.

9. The structure described in claim 8 characterized by said movable gate section being pivotally mounted intermediate the ends of said fixed gate section, and further characterized by means for providing a passage-way for the film from the upper portion of said fixed gate section to the lower portion of said fixed gate section past the pivoted portion of said movable gate section.

10. In a film handling apparatus having a source of light, a gate including a fixed section having an aperture for cooperation with said source of light, said gate further including a movable section having an aperture for cooperation with said first named aperture, said movable section having perforations therethrough adjacent the aperture therein, said movable section having a mounting so arranged that when said gate is opened the aperture in said movable section is moved out of the path of light from said source to said aperture in said fixed section, and said perforations in said movable gate section are moved into said light path when said gate is opened whereby said light source may illuminate said gate without danger of burning the film therein when said gate is opened and the film is stationary.

11. In a film handling apparatus having a source of light, in combination, a gate including a fixed section disposed in fixed relation to said light source and a movable section, an aperture in said fixed section for cooperation with said light source, and condensing lens mounted on said movable section opposite said aperture for cooperation with said light source.

12. In a film handling apparatus, having a source of light, in combination, a gate having an apertured fixed section and a pivoted section movable relative to said light source, and condensing lens mounted on said pivoted section opposite the aperture of said fixed section, said lens being arranged for focusing light from said source upon the film in said aperture, said pivoted gate section being so mounted that a slight movement of said pivoted section upon opening said gate is effective to immediately destroy the focus of said light with respect to said film whereby said film is protected from being damaged by heat from said light source when said gate is slightly open.

13. In a film handling apparatus, in combination, a fixed gate section having an upper portion and a lower portion offset with respect thereto so that one side of said upper portion and the opposite side of said lower portion define a substantially straight work path for the film through the gate, and a movable gate section pivotally mounted between said upper fixed gate portion and said lower fixed gate portion, an opening being provided between said portions of said fixed gate sections through which said movable gate section passes, said movable gate section including an upper portion and a lower portion offset from said upper movable gate portion, said movable gate portions being so disposed relatively to said fixed gate section that said upper movable gate portion engages squarely against said upper fixed gate portion and said lower movable gate portion engages squarely against said lower fixed gate portion when said gate is closed, and yielding means for holding said pivoted movable gate portions against said fixed gate portions.

14. In a gate for a film handling apparatus, in combination, a fixed gate section including an upper fixed gate portion and a lower fixed gate portion, said gate portions being spaced apart and disposed in parallel planes slightly offset from each other, and a movable gate section pivotally mounted on an axis substantially parallel to the planes of said fixed gate portions and positioned between the same, said pivotally mounted gate section being movable from a film feeding position adjacent said fixed gate portions to a film rewinding position substantially perpendicular to the said film feeding position wherein it forms a film rewinding path in said apparatus.

15. In a gate for a film handling apparatus, an upright fixed gate section, a movable gate section, pivotally mounted intermediate the ends of said fixed section and movable from an operative film feeding position against and parallel to said fixed section to a film rewinding position approximately at right angles to said fixed section, said movable section when disposed in the film rewinding position being so disposed that the film moves along over the top side of upper portion thereof and along the under side of the lower portion thereof, film feeding means disposed below the pivot of said gate section for engaging the film disposed within said gate, and a stripper device on the lower portion of said movable gate section for necessarily removing the film from engagement with said feeding means preparatory to rewinding the film, said device including means effective for supporting the film in its rewinding path below the lower portion of said movable section.

16. The structure described in claim 14 characterized by said movable gate section carrying stripper means effective for moving the film with it from a film feeding position to a film rewinding position, said stripper means in said rewinding position forming an element of said rewinding path.

17. In a gate for a film handling apparatus, in combination, a fixed gate section, a movable gate section displaceably mounted for movement away from said fixed gate section from a film feeding position in which said movable gate section is disposed in adjacent relation to said fixed gate section to a film guiding position in which said movable section is disposed relatively distantly from said fixed gate section, and means carried by said movable gate section for releasably latching it to said fixed gate section when said gate is disposed in said film feeding position wherein it is operative for film feeding purposes, said latching means including members on the side edges of said movable gate section positioned to serve as side edge guides for the film when said movable gate section is moved away from said fixed gate section to said film rewinding position.

18. In a film handling apparatus having a vertical path along which a film is fed and a member for feeding the film along said vertical path, means for pressing the film into driven engagement with said feeding member, said means including a presser member pivotally mounted above said feeding member and movable away from said feeding member to a position wherein the film may be threaded therealong over a shorter path through said apparatus, said presser member upon movement downwardly through an arc being effective to bring the film into engagement with said feeding member so that the film may be fed thereby, and means for maintaining the film in adjacent relation to said presser member during such downward movement thereof.

19. A gate for use in a film handling apparatus comprising a vertically mounted relatively fixed gate section and a section movable relatively thereto to a position adjacent and parallel thereto wherein it cooperates with said fixed gate section to provide a path through which a film may be fed, said movable section being pivotally mounted at a point above a portion of said fixed gate section and movable away from said fixed gate section so as to provide a shorter path through said apparatus along which the film may be threaded, said pivotally mounted section being movable downwardly through an arc into such cooperative relation to said fixed gate section, and means for holding the film in adjacent relation to said movable gate section during such downward movement.

20. A gate for use in a film handling apparatus having a delivery carrier and a take up carrier and a path for the film therebetween, said gate having a fixed section and a movable section, said movable section having a pivotal mounting upon an axis at right angles to said film path and being disposable in a film feeding position against said fixed section, in which position said sections form a portion of said film path between said carriers, the film feeding position of said gate being such that the feeding path of the film passing through said gate from said delivery carrier to said take up carrier is characterized by at least one distinct change of direction, said movable gate having means for defining an auxiliary path of the film through said gate which auxiliary path is materially shorter and straighter than said feeding film feeding path.

21. In a gate for a film handling apparatus having a source of light mounted in the rear of said gate and to one side thereof, in combination, an upright apertured fixed gate section, a movable gate section pivotally mounted on a horizontal axis for movement away from said fixed gate section in a plane normal to the plane of said fixed section to a film rewinding or film threading position, a light deflecting means mounted on said movable gate section below the upper end of the fixed gate section for directing light to the aperture of said fixed gate section, and means for guiding a film from a point below said gate past said light deflecting means and to the upper ends of said gate section, so as to clear the path of the light from said source to said aperture.

22. In a film handling apparatus, a gate including in combination, a fixed gate section including an upper portion and a lower portion which is oppositely faced and offset from said upper portion in the same lateral plane thereof, a resilient curved member on the upper end of said upper portion for guiding a film into said gate, a resilient curved member mounted on the lower end of said lower portion of said fixed gate section and turned in the opposite direction from said upper curved member for guiding the film from said gate, the inner ends of said fixed gate portions being spaced apart, a movable gate section having an upper portion and a lower portion arranged in opposite relation to each other so as to engage squarely against the upper and lower portions respectively of said fixed gate section, and a pivotal mounting for said movable gate section disposed at one side of said fixed gate section opposite the space between the upper and lower portions of said fixed gate section, said movable gate section having a central connecting web portion fastened to said pivot member, said connecting web portion being offset laterally so as to leave a film passageway from the upper portion to the lower portion of said movable gate section.

23. In a film handling apparatus, a gate defining a substantially straight film path therethrough, one portion of said gate along said film path being offset and oppositely faced from another portion along said film path.

24. In a film handling apparatus, a gate defining a substantially straight film path, one transverse portion of the film-path-defining surface of said gate being offset and oppositely faced from the remaining transverse portion of said path-defining surface.

25. A fixed motion picture gate section defining a substantially straight upright film path, the lower portion of said gate section being offset from the upper portion thereof and faced in the opposite direction.

26. In a film handling apparatus, a gate section defining a substantially straight film path, a portion of said gate section being offset and oppositely faced from another integrally joined portion of said gate section, said gate section having a portion cut away between said offset portions.

27. In a film handling apparatus, a gate section having two integrally joined, oppositely faced, offset film-path-defining portions and a portion cut away between said path defining portions.

28. In a film handling apparatus, a gate section defining an upright film path, said gate section including an upper portion faced in one direction and a lower integral portion faced in the opposite direction, a portion of said gate section being cut away between said upper and lower gate portions to permit a film to pass directly from one of said gate portions to the other.

29. In an operable gate for a film handling apparatus, an upright fixed gate section having an upper portion and a lower portion offset from the upper portion and faced in the opposite direction, a portion of said fixed gate section being cut away between said upper and lower gate portions to permit a film to pass from one of said gate portions to the other, and a movable gate section constructed for cooperation with said fixed gate section, and means for mounting said last named section for movement to cooperative relation with said fixed gate section and away from the same to open position of said gate.

30. In a film handling apparatus, an upright fixed gate section having an upper portion and a lower portion offset from the upper portion and faced in the opposite direction, a portion of said fixed gate section being cut away between said upper portion and said lower portion, and a movable gate section constructed for cooperation with said fixed gate section, and a pivotal mounting for said movable section in the cut-away space in said fixed section.

31. In a film handling apparatus having an upright fixed gate section with an upper portion and a lower portion offset from said upper portion and faced in the opposite direction and spaced away from said upper portion, a movable gate section having an upper and a lower portion offset from said upper portion and faced in the opposite direction, and a mounting for said movable gate section the offset arrangement of said movable gate section corresponding to the offset arrangement of said fixed gate section, and the mounting for said movable gate section being arranged for bringing the same into cooperative relation with said fixed gate section.

32. In a film handling apparatus, a fixed gate section having two separate, oppositely faced film-path-defining surfaces, one of said surfaces being disposed adjacent the supply end of said gate and the other of said surfaces being disposed adjacent the take-up end of said gate, and means for maintaining the film in operative relation to each of said surfaces.

33. In a film handling apparatus, a gate having two film-path-defining portions spaced apart along the film feeding path through said gate and faced in opposite directions, each of said portions including means for maintaining the film in operative relation to said portions while the film is being fed.

34. In a motion picture apparatus, a gate having two longitudinally spaced portions, each disposed along the film path and faced in opposite directions, each of said gate portions including a fixed gate section and a complementary film pressing section movable away from the associated fixed section in the direction said associated fixed section faces.

35. In a film handling apparatus having a delivery carrier and a take-up carrier, a gate disposed between the axes of said carriers in a plane substantially normal to a plane through said axes, said gate including a fixed section and a movable section effective for defining a film feeding path a portion of which is substantially normal to the plane through said axes of said carriers, said gate further including means cooperating with said fixed gate section and said movable gate section for defining an auxiliary film path between said carriers, a portion of which is substantially parallel to the plane through said axes of said carriers.

36. In a film handling apparatus having a delivery carrier and a take-up carrier, a gate disposed between the axes of said carriers in a plane substantially normal to a plane through said axes, said gate including a fixed section and a movable section effective for defining a film feeding path a portion of which is substantially normal to the plane through said axes of said carriers, said gate further including means cooperating with said fixed gate section and said movable gate section for defining an auxiliary film path between said carriers, a portion of which is substantially parallel to the plane through said axes of said carriers, said auxiliary path defining means including a mounting for said movable gate section, said mounting including an axle normal to the lateral plane of said gate, and a connecting member fastened to said axle and to said movable gate sections, said connecting member having a portion cut away in order to provide an opening between the two gate portions through which the film may pass while the gate is disposed in either said film threading path or said auxiliary path.

37. In a film handling apparatus having a delivery carrier and a take-up carrier, a gate disposed between said carriers, said gate including two fixed sections spaced apart end to end along the film feeding path through said gate, each of said sections defining a portion of said film feeding path, said gate further including guiding means co-operating with the space between the said gate sections for providing an auxiliary film path passing from one of said carriers to the other through said space between the adjacent ends of said gate sections.

38. In a film handling apparatus having a delivery carrier and take-up carrier, a gate disposed between said carriers and having two film-path-defining portions, spaced apart end to end along the film feeding path through said gate and faced in opposite directions, and means co-operating with the space between said gate portions for providing a more direct way for the film through said gate while it is being rewound from said take-up carrier to said delivery carrier.

39. In a film handling apparatus, a fixed gate section defining a film feeding path, a gate section movable angularly away from said film section in the lateral plane thereof a large angular extent to an auxiliary position, means for guiding the film along the work face of said movable section while said movable section is in co-operative relation with said fixed gate section, and means for guiding the film along said movable section while said movable section is in its auxiliary position.

40. In a film handling apparatus having a delivery carrier and a take-up carrier, a fixed gate section defining a portion of a film feeding path between said carriers, a gate section movable angularly away from said fixed section in the lateral plane thereof a large angular extent to a film rewinding position, and means for guiding the film along said movable gate section while said movable section is in its film rewinding position, said guiding means including a film guiding member mounted on the take-up end portion of said movable gate section, over which guiding member the film passes during rewinding operations, said guiding means further including lateral members on the delivery end portion of said movable gate section.

41. In a film handling apparatus, a gate including a first fixed gate section engaging one side of one portion of the film, a second fixed gate section engaging the other side of another portion of the film, a first movable section disposed opposite said first fixed section and engaging the side of the film opposite that engaged by said first fixed section, a second movable section opposite said second fixed section and engaging the side of the film opposite that engaged by said second fixed section, means connecting said first and second movable sections for concomitantly moving said movable sections toward and away from said fixed sections, and means for guiding the film into and away from said gate, said means including an arcuate film guiding member mounted on the end of said first fixed gate section farthest from said second fixed gate section, said means further including a second arcuate film guiding member mounted on said second fixed gate section on the end thereof farthest from said first fixed section, the free ends of said arcuate members being turned to extend along the adjacent portions of the film path of said apparatus.

42. In a film handling apparatus having a delivery carrier and a take-up carrier, a gate disposed between said carriers, said gate including a first fixed gate section engaging one side of one portion of the film, a second fixed gate section engaging the other side of another portion of the film, a first movable section disposed opposite said first fixed section and engaging the side of the film opposite that engaged by said first fixed section, a second movable section opposite said second fixed section and engaging the side of the film opposite that engaged by said second fixed section, means connecting said first and second movable sections for concomitantly moving said movable sections toward and away from said fixed sections, and an arcuate film guiding member mounted on the outer end of each of said movable gate sections, each of said arcuate guiding members being turned toward the adjacent carrier.

43. In a film handling apparatus having a delivery carirer and a take-up carrier, a gate disposed between said carriers, said gate including a first fixed gate section engaging one side of one portion of the film, a second fixed gate section engaging the other side of another portion of the film, a first movable section disposed opposite said first fixed section and engaging the side of the film opposite that engaged by said first fixed section, a second movable section opposite said second fixed section and engaging the side of the film opposite that engaged by said second fixed section, means connecting said first and second movable sections for concomitantly moving said movable sections toward and away from said fixed sections, and an arcuate film guiding member mounted on the outer end of each of said movable gate sections, each of said arcuate guiding members being turned toward the adjacent carrier, said film guiding members being constructed of resilient material to have a material yielding movement under the tension of the film as it is fed thereover.

44. In a film handling apparatus having a delivery carrier and a take-up carrier, a gate having its plane disposed between said carriers and including two film-path-defining portions spaced apart along the film feeding path through said gate, each of said gate portions including a fixed gate section element and a movable gate section element, the fixed gate section element of each of said gate portions being disposed along said film path on the side thereof next to the relatively adjacent carrier.

45. In a film handling apparatus having a delivery carrier and a take-up carrier, a gate having its plane disposed between said carriers and including two film-path-defining portions spaced apart along the film feeding path through said gate, each of said gate portions including a fixed gate section element and a movable gate section element, the fixed gate section element of each of said gate portions being disposed along said film path on the side thereof next to the relatively adjacent carrier and including film guiding means mounted on each of said fixed gate section elements for guiding the film into and out of the plane of said gate.

46. In a motion picture projector, an openable apertured gate through which a film travels, a source for passing concentrated light to the aperture of said gate for the purpose of projecting pictures from the film traveling therethrough, said gate including a movable section movable away from said fixed section in the lateral plane of said aperture, and means carried by said movable section operable for passing a variable portion of said light to said aperture when said gate is open, the capacity of said light passing means being varied by movement of said movable gate portion.

47. A gate for use in a film handling apparatus comprising a first fixed gate section engaging one side of one portion of the film, a second fixed section concomitantly engaging the other side of another portion of the film, a first movable section disposed opposite said first fixed section and engaging the side of the film opposite that engaged by said first fixed section, a second movable section opposite said second fixed section and engaging the side of the film opposite that engaged by said second fixed section, means for mounting said first and second movable sections for concomitant movement toward and away from said fixed sections, and means for simultaneously urging said first and second movable sections toward said fixed sections.

48. In a film handling apparatus having a fixed gate section with an upper portion and a lower portion offset from said upper portion and faced in the opposite direction and spaced away from said upper portion, a movable gate section having an upper and a lower portion offset from said upper portion and faced in the opposite direction, the offset arrangement of said movable gate section corresponding to the offset arrangement of said fixed gate section whereby the movable gate section may cooperate with said fixed gate section, said movable gate section having a mounting including an axle on which said movable gate section is mounted, and spring means tending to rotate said axle so as to swing said movable gate section against said fixed gate section.

49. In a film handling apparatus having a light source, an apertured gate the plane of which is disposed parallel to the path of the light from said source, said gate including a fixed gate section defining a film feeding path, and a movable gate section having means mounted thereon for deflecting light from said source through said aperture, said movable gate section being movable away from said fixed gate section so as to remove said deflecting means from said light path, and means carried by said fixed gate section for arresting the light from said source and deflecting a portion of said light along said movable gate section when the same is in open position.

50. In a film handling apparatus having a light source, an apertured gate the plane of which is disposed parallel to the path of the light from said source, said gate including a fixed gate section defining a film feeding path, and a movable gate section having means mounted thereon for deflecting light from said source through said aperture, said movable gate section being movable away from said fixed gate section so as to remove said deflecting means from said light path, and means carried by said fixed gate section for arresting the light from said source and deflecting a portion of said light along said movable gate section when the same is in open position, said arresting means being disposed on the other side of the lateral plane of said gate from said light source whereby said arresting means is effective to intercept the beam of light from said source before it can reach and adversely affect the operator of the apparatus.

FREDERICK DAVENPORT SWEET.
WARREN DUNHAM FOSTER.